United States Patent Office 3,447,781
Patented June 3, 1969

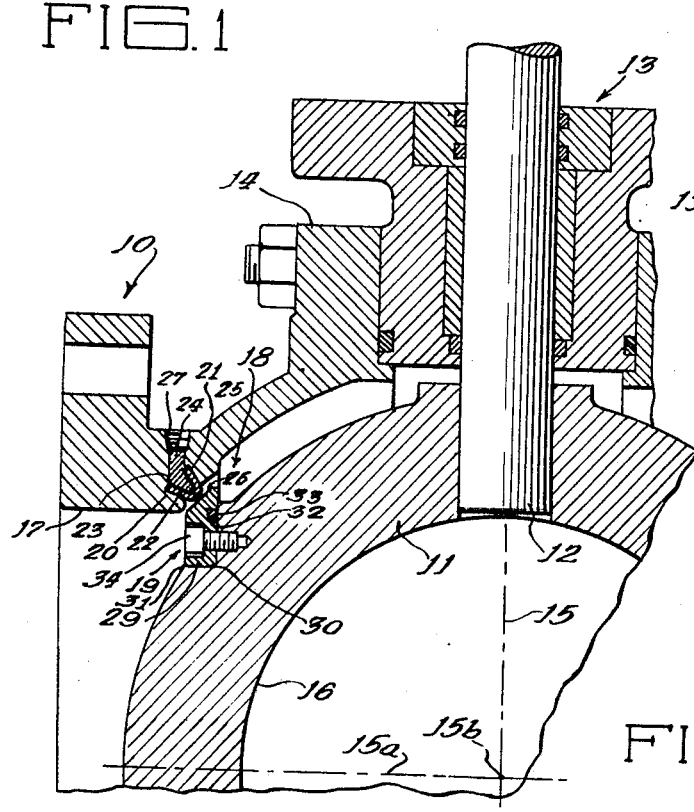

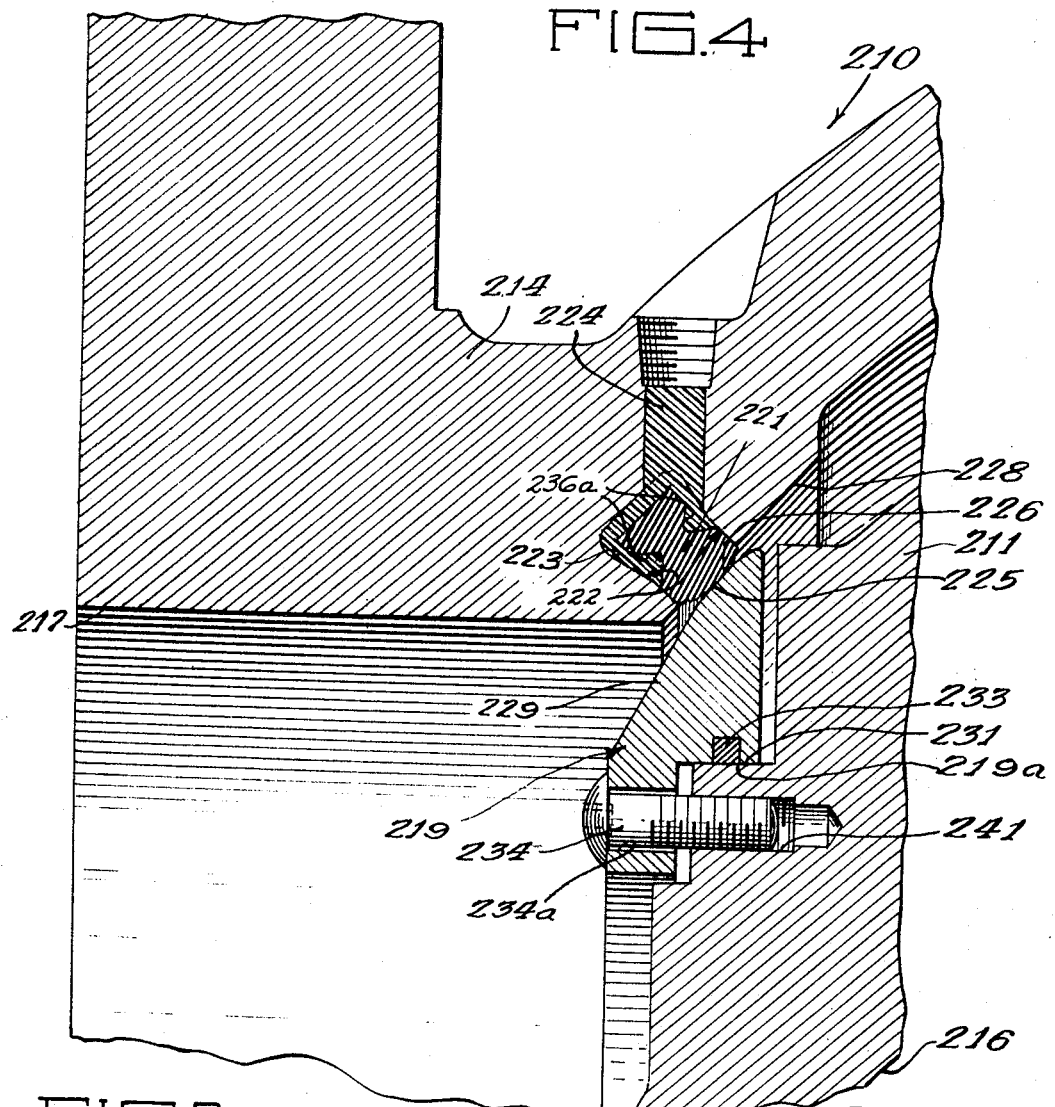
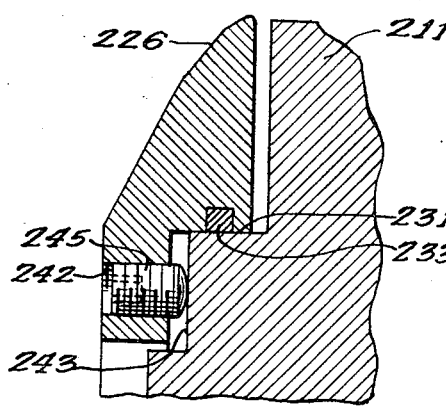
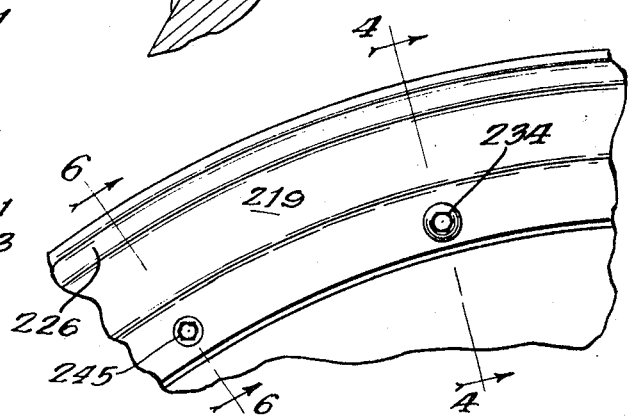

3,447,781
BALL VALVE STRUCTURE
Donald G. Fawkes, Aurora, Ill., assignor to Henry Pratt Company, a corporation of Illinois
Continuation-in-part of application Ser. No. 269,527, Apr. 1, 1963. This application Feb. 10, 1967, Ser. No. 615,093
Int. Cl. F16k 5/20
U.S. Cl. 251—315           12 Claims

ABSTRACT OF THE DISCLOSURE

A ball valve having a seat ring on the ball accurately located relative to the axis of rotation of the ball, and a seal having an interlock portion received in an annular groove in the body of the valve and a seat portion extending outwardly from the groove and urged into uniform compressive sealing engagement with the seat surface on the ball by a set plastic body in the groove. The seat surface on the ball may be accurately related to the axis of rotation by forming the seat surface in place on the ball in a suitable mold, or by adjustably mounting the means defining the seat surface on the ball and adjusting the disposition thereof accurately relative to the axis.

---

This application comprises a continuation-in-part of my copending application Ser. No. 269,527, filed Apr. 1, 1963, now Patent No. 3,304,050.

This invention relates to ball valves and in particular to sealing structure for use in ball valves.

In one well known form of ball valve, the ball, or rotor member, is mounted on suitable shaft means for rotation of the ball about a preselected axis. The shaft means are journalled in suitable bearings carried on a valve body defining a fluid flow passage in which the ball is disposed. The ball is provided with a through bore intersected by the axis of rotation so that the ball may be selectively disposed in a closed position wherein the bore is transverse to the fluid flow passage, and in an opened position wherein the ball is aligned with the fluid flow passage. A desirable feature of such ball valves is that the ball bore may have a diameter at least as large as the diameter of the fluid flow passage so that a substantially unrestricted flow is permitted through the valve when the valve is in the open position.

The present invention is concerned with an improved means for sealing the ball to the valve body when the ball is in the closed position. Satisfactory sealing of such ball valves presents a serious problem in that such ball valves may be relatively large and are often required to handle fluids under substantial pressures such as 250 pounds per square inch. At such pressures and with such relatively large size valve elements, substantial forces are generated tending to deflect portions of the valve and requiring relatively low tolerances in the sealing means structures. Another problem encountered in such ball valves is the need for corrosion resistant sealing means, while yet the relatively massive ball and body elements are preferably formed of relatively low cost cast iron or similar material. A further problem in such ball valves is the need for maintaining a relatively accurate relationship between the yieldable seal element and the confronting seating element as sliding movement therebetween occurs in the operation of the ball valve tending to wear the sealing surfaces.

The present invention comprehends an improved ball valve structure eliminating the disadvantages of the known ball valves in a novel and simple manner. Thus, a principal feature of the present invention is the provision of a new and improved ball valve.

Another feature of the invention is the provision of such a ball valve having new and improved sealing structure.

A further feature of the invention is the provision of such a ball valve having new and improved means defining a seating surface on the ball accurately located relative to the axis of rotation thereof for improved sealing engagement by suitable sealing means carried by the valve body.

Still another feature of the invention is the provision of such a ball valve wherein the seating element is molded in place on the ball.

A further feature of the invention is the provision of such a ball valve having new and improved sealing means carried by the body for sealing engagement with the seating surface of the ball.

A yet further feature of the invention is the provision of such a ball valve having new and improved means for adjustably positioning the seating surface on the ball.

A further feature of the invention is the provision of such a ball valve having new and improved means for providing a corrosion resistant seating surface on the ball.

Another feature of the invention is the provision of such a ball valve having a body defining a fluid flow passage, a ball having a through bore, and means for mounting the ball in the flow passage for rotation about an axis intersecting the bore between a closed position wherein the bore is transverse to the passage and an open position wherein the bore is aligned with the passage, sealing structure comprising seat ring means on the ball forming a seat surface extending annularly about an axis intersecting the axis of the ball bore and spaced accurately from the axis of rotation, means defining an annular surface on the body confronting the seat surface when the ball is in the closed position and spaced accurately from the axis, means defining an annular channel in the body opening through the annular surface, an annular seal having an inner interlock portion in the channel and an outer seat portion extending outwardly from the channel for sealing engagement with the seat surface when the ball is in the closed position, and a body of set plastic material in the channel exerting pressure against the seal to bias the seat portion outwardly into uniform compressed sealing engagement with the seat, the set plastic material further mechanically interlocking with the interlock portion of the seal to retain the seal in association with the body.

A further feature of the invention is the provision of such a ball valve wherein the sealing structure is disposed adjacent the downstream portion of the ball.

A yet further feature of the invention is the provision of such a ball valve wherein the confronting surfaces of the body and ball members at the sealing structure are frustoconical at an angle greater than 45° to the axis of the ball bore.

Another feature of the invention is the provision of such a ball valve wherein the seating surface is formed of a molded plastic such as epoxy resin.

Other features and advantages of the invention will be apparent from the following description taken in connection with the accompanying drawing wherein:

FIGURE 1 is a fragmentary diametric section of a ball valve provided with a sealing structure embodying the invention;

FIGURE 2 is a fragmentary enlarged diametric section of a ball valve provided with a modified sealing structure embodying the invention;

FIGURE 3 is a fragmentary exploded diametric section thereof;

FIGURE 4 is a fragmentary diametric section of a ball valve provided with another form of sealing structure embodying the invention;

FIGURE 5 is a fragmentary reduced transverse section thereof; and

FIGURE 6 is a fragmentary diametric section taken substantially along the line 6—6 of FIGURE 5.

In the exemplary embodiment of the invention as shown in FIGURE 1 of the drawing, a ball valve generally designated 10 is shown to be provided with a ball 11 provided with suitable shaft structure 12 rotatably carried in suitable journals 13 on a body 14 for rotation about an axis 15. The ball, or rotor, 11 is provided with a through bore 16 which is intersected by the axis 15 and which has a diameter corresponding to the diameter of a fluid flow passage 17 in the body 14. Means are provided for sealing the ball 11 to the body 14 in a closed position of the ball, as shown in FIGURE 1, wherein the bore 16 extends transversely to the flow passage 17, and herein the sealing means comprises a structure generally designated 18 including seating structure 19 carried on the ball 11 and sealing structure 20 carried on the body 14 for sealing engagement with the seating structure 19 when the valve is in the closed position of FIGURE 1.

More specifically, the seat structure 19 and sealing structure 20 are fully disclosed in my copending application Ser. No. 269,527, filed Apr. 1, 1963. Briefly, however, the sealing structure 20 includes a resilient seal 21 formed of a suitable material such as rubber. The seal 21 may be formed in a generally U-shaped configuration to engage the side walls 22 of an annular groove, or channel, 23 in the valve body. A body 24 of plastic material is disposed behind the valve seat in the groove 23 to stress selectively the valve seat for adjusting the configuration of the outer sealing surface 25 thereof to accurately conform to the confronting seating surface 26 of the seating structure 19. Plastic body 24 comprises a set mass of plastic material which is introduced into the groove 23 behind the seal 21 through a suitable inlet 27 in the valve body. The plastic material flows annularly along the groove to behind the entire seal 21, and the fluid pressure thereof causes the seal member to be urged outwardly relative to the groove in the manner of a flexible piston, with the fluid pressure further biasing the legs of the U-shaped seal against the side walls 22 of the groove 23 to preclude loss of the plastic outwardly therearound during this adjustment of the seal. Thus, the fluid pressure of the plastic material first urges the entire seal 21 through the gap between the inner surface 28 of the body and the surface 26 of the seat structure 19 which, illustratively, may be of the order of 1/16 to 3/32 inch. The pressure causes the sealing surface 25 to be urged against the seat surface 26 uniformly along the length of the seal 21 notwithstanding the fact that the surface 26 may not be accurately circular about the seat axis 15a which perpendicularly intersects the intersection of rotation axis 15 and the axis 15b of bore 16, or may have irregularities therein.

The plastic material is then allowed to set in the groove 23 while the pressure therein is maintained. More specifically, the plastic material may comprise an epoxy resin. Another example of material suitable for such use is polyurethane foam plastic. Once the plastic body 24 has set, the pressure force may be removed. Thus, the sealing surface 25 is uniformly compressed against the seat surface 26 of the structure 19, the compression being substantially uniform along the entire length of the seal as the seal is firstly flexed into abutment with the seat surface 26 without generating substantial compression forces therein to permit the fluid pressure to act uniformly in compressing the seal at the surface 25 uniformly along the length of the seal. The plastic mass is set while maintaining the ball 11 in the closed position to define a back-up for the seal. When the ball is moved to the open position wherein the seat structure 19 is spaced from the seal 21, the rubber at the seal surface 25 is relaxed. When the ball 11 is again moved to the closed position bringing seat surface 26 against the seal surface 25, the seal is again compressed at surface 25 substantially the same uniform amount as in the original compressional adjustment of the seal by the fluid plastic pressure whereby an effective, positive uniform seal is provided between the two valve members wherein all portions of the seal at surface 25 are substantially uniformly compressed against the seat surface 26 notwithstanding a noncircular, or irregular, arrangement of the surface 25.

The invention comprehends the provision of the seat structure 19 in accurate spaced relationship to the axis 15 of rotation of the ball 11 and, thus, in accurate spaced relationship to the surface 28 of the body 14, which is also accurately related at groove 23 to the axis 15. More specifically, the seat structure 19 may include an annular seat 29 received in a groove 30 on ball 11 and having a right angularly related, planar longitudinal surface 31 and transverse surface 32. The seat 29 may be sealed to the body 14 by a suitable O-ring 33 and clamped thereto by a plurality of screws 34.

Referring now to FIGURES 2 and 3, a modified form of ball valve construction generally designated 110 is shown to comprise a ball 111 received in a valve body 114. A seal 121 is provided in an annular groove, or channel, 123, having side walls 122, in the valve body for sealing coaction with a seat 119 on the ball. The seal 121 is preferably formed of a resilient material such as rubber and is adjusted in the groove 123 by the introduction of a fluid plastic body 124 therebehind which is introduced into the groove through a suitable inlet 127. Seal 121 differs from seal 21 of valve 10 in being generally anvil shaped in cross section and having an outer seating portion 135 and an inner retaining portion 136 having shoulders 136a facing outwardly through the opening of the groove and toward the side walls 122. The width of the retaining portion 136 is preferably slightly less than the width of the seating portion 135 whereby the retaining portion may be readily inserted through an outer portion 137 of groove 123 defined by parallel, substantially frustoconical, side walls 137a and 137b. The inner portion 138 of the groove 123 is enlarged, being defined by inwardly diverging, frustoconical side walls 138a and 138b and a bottom wall 139.

The seating portion 135 of the seal 121 is provided with a series of annular ribs 140 which are spaced about the seating surface 125 and which extend to the side surfaces 135a and 135b of the seating portion.

Illustratively, the retaining portion 136 may have a width of .55 inch where the seating portion has a width of .66 inch, and the side walls 137a and 137b are spaced apart .60 inch. The side walls 138a and 138b may diverge at an angle of approximately 15° relative to the corresponding surfaces 137a and 137b, and the depth of the sponding surfaces 137a and 137b, and the depth of the groove may be approximately 25/32 inch. The body surface 128 through which the groove 123 opens is preferably frustoconical at an angle of approximately 47°, 45 minutes to the axis of the flow passage 117 in the body 114 which perpendicularly bisects the axis of rotation of the ball 111. The groove 123 is spaced from the passage 117 by an inner portion 128a of surface 128 which herein extends approximately 5/16 of an inch therebetween. The corner 128b at the juncture of surface 128a and passage 117 herein is spaced approximately 11¾ inches from the axis of rotation of the ball 111 and approximately 10 inches from the seat axis.

The seat structure 119 in the embodiment of FIGURES 2 and 3 comprises a molded in place seat which may be formed of a suitable material such as plastic and herein comprises a corrosion resistant epoxy molded seat. The seat surface 126 is frustoconically parallel to surface 128 and is spaced therefrom approximately 1/16 inch to 3/32 inch. Surface 126 is accurately spaced from the rotational axis of the ball 111 and the common axis of the ball bore 116 and flow passage 117 to provide a corresponding accuracy in the spacing thereof from the surface 128.

Thus, the structure of ball valve 110 is generally similar to the structure of ball valve 10. The seal 121 is urged outwardly from the groove 123 by the fluid pressure of the fluid plastic 124 introduced into the bottom of the groove 123 through the inlet passage 127. For facilitated introduction of the fluid plastic into the groove 123, a passage (not shown) similar to passage 127 and spaced 180° about the body flow passage 117 is provided to vent the groove while the groove is being filled with plastic from the passage 127. When the groove 123 is completely filled with plastic, pressure is suitably applied to the fluid plastic to urge the seal outwardly from the groove 123 into adjusted engagement with the seating surface 126. As in valve 10, the seal flexes to accommodate itself to any out of roundness of the seat 126 and to any irregularities therein prior to the effective compression of the seal surface 125 against the seat surface 126, whereby uniform compression is obtained along the length of the seal. The pressure is maintained until the body of plastic 124 sets, whereupon the plastic locks the seal in the groove by the interlocking relationship thereof with the retaining portion 136 while positioning the seal to have the uniform compressional engagement with the seating surface 126 when the ball 111 is in the closed position of FIGURE 2. As in ball valve 10, when the ball 111 moves to the open position, the seal expands inwardly somewhat, and when the ball is returned to the closed position, the seat surface 126 engages the sealing surface 125 whereupon uniform compression of the seal surface portion is again effected in sealingly closing the valve.

Referring now to the embodiment of FIGURES 4 through 6, a further modified ball valve generally designated 210 is shown to comprise a ball 211 rotatably mounted in a body 214 having an annular groove, as channel 223, having side walls 222, similar to groove 123 of valve 110, and provided therein with a seal 221, similar to seal 121 of valve 110. The seal 221 includes interlocking shoulders 236a which open outwardly through the opening of the groove and toward the side walls 222. Ball valve 210 differs from valve 110 in the provision of seat structure 219 comprising a metal annular seat 229 defining a frustoconical seat surface 226 frustoconically parallel to surface 228 of the body 214 through which the groove 223 opens. The seat 229 further defines an annular surface 219a which slidably engages an annular surface 231 on ball 211 coaxial to the seat axis. Annulus seat 229 may be adjusted longitudinally of surface 231 by a plurality of cap screws 234 and a plurality of set screws 245 alternating annularly about the axis of surface 231. As illustrated in FIGURE 4, the cap screws 234 may extend through a suitable bore 234a in the seat 229 to be threaded into a threaded bore 241 in the ball 211 for urging the seat 229 toward the ball 211. The set screws 245 may be threaded into suitable threaded bores 242 in the seat 229 and bear against a planar annular surface 243 on the ball 211 for urging the seat 229 away from the ball 211 whereby the seat 229 may be accurately adjusted to bring the seat surface 226 accurately to the desired spacing from body surface 228.

The valve structure 210 functions similarly to valve structures 10 and 110 in that the seal 221 is accurately adjusted relative to the groove 223 by the fluid pressure of the fluid plastic body 224 to provide uniform compressional engagement of the seal surface 225 with the seat surface 226. Seat structure 219 provides the further advantage of permitting adjustment of the seat 229 subsequent to the setting of the seal 221 in adjusted position in the valve body 214. Thus, if for any reason it is desired to adjust the seat 229 in the field subsequent to installation of the valve, the screws 234 and 245 may be suitably adjusted at any time with the O-ring 233 providing a maintained seal of the seat 229 with the ball 211.

Thus, each of valve structures 110 and 210 is generally similar to ball valve structure 10 and functions in a similar manner. Elements of ball valve 110 corresponding to similar elements of ball valve 10 are identified by similar reference numerals but one hundred higher, and elements of ball valve 210 corresponding to similar elements of ball valve 10 are identified by similar reference numerals but two hundred higher.

Balls 11, 111, 211 may be formed of a suitable material such as cast iron, and seats 29 and 229 may be formed of a suitable material such as corrosion resistant metal. Illustratively, the seats may be formed of stainless steel, bronze, nickel alloys, etc.

Preferably, the seal and seat structures of the disclosed embodiments are provided on the downstream portion of the ball 211 whereby fluid pressures acting on the ball tending to urge the ball in a downstream direction tend to effect a further enhanced sealing engagement between the seal and seat structures. Thus, where the ball valve is relatively large and designed to handle relatively substantial pressures, such as a ball valve having a 20-inch waterway and designed to handle up to 250 pounds per square inch pressures, the substantial forces generated against the ball may be resisted to some extent by the engagement of the seat with the seal, as well as by the shaft mounting. In certain instances as where flow through the valve is to be controlled in both directions therethrough, the seal and seat structures may be provided both at the upstream portion and the downstream portion of the valve.

While I have shown and described certain embodiments of my invention, it is to be understood that it is capable of many modifications. Changes, therefore, in the construction and arrangement may be made without departing from the spirit and scope of the invention as defined in the appended claims.

I claim:

1. In a ball valve having a body defining a fluid flow passage, a ball having a through bore, and shaft means for mounting said ball in said flow passage for rotation about a fixed axis intersecting said bore between a closed position wherein said bore is transverse to said passage and an open position wherein said bore is aligned with said passage to permit substantially straightline fluid flow through the open valve, sealing structure comprising:

seat ring means on said ball forming a flared seat surface extending annularly about an axis intersecting the axis of the ball bore and spaced accurately from said fixed axis of rotation of the ball;

means defining an annular flared surface on said body facing said ball seat surface when said ball is in the closed position, said body surface being spaced accurately from said fixed axis;

means defining an annular channel in said body, said channel having side walls and an outer opening through said annular surface;

an annular seal having an inner interlock portion in said channel spaced intermediate said side walls and defining annular shoulder means facing toward said opening, an outer seat portion extending outwardly from the channel for sealing engagement with said seat surface on the ball seat ring means when said ball is in the closed position; and a body of set plastic material in said channel exerting pressure against said seal to bias said seat portion outwardly partially through said opening toward said ball into uniform compressed sealing engagement with said ball seat surface, said set plastic material further extending from behind said seal between said side walls and said interlock portion to outwardly of said shoulder means for mechanically interlocking with said interlock portion of said seal to retain the seal in adjusted association with said body.

2. The ball valve structure of claim 1 including means adjustable from within the body flow passage for adjustably mounting said seat ring means on said ball.

3. The ball valve structure of claim 1 wherein said seat ring means is molded in place on said ball.

4. The ball valve structure of claim 1 wherein said seat surface of said seat ring is frustoconical.

5. The ball valve structure of claim 1 wherein said body surface is frustoconical.

6. The ball valve structure of claim 1 wherein said body surface is disposed adjacent downstream portion of the ball.

7. The ball valve structure of claim 1 wherein said seat surface and said body surface are frustoconical at an angle slightly greater than 45° to said ball bore axis.

8. The ball valve structure of claim 1 wherein said seat ring means is formed of an epoxy resin.

9. The ball valve structure of claim 1 wherein said seat ring is formed of a material differing from that of which the ball is formed.

10. The ball valve structure of claim 1 wherein said seat ring seat surface is adjusted to be spaced from said body surface accurately a preselected distance and said plastic material biases said seat portion outwardly against said seat surface to have substantially uniform compression thereagainst throughout the length of the said seal.

11. The ball valve structure of claim 1 wherein said seat ring is adjustably mounted on said ball and said plastic material is set with the seal being urged against the ring subsequent to adjustment thereof to be accurately spaced from said axis of rotation.

12. The ball valve structure of claim 1 wherein said shoulder means faces angularly toward said channel side walls.

References Cited

UNITED STATES PATENTS

| | | | |
|---|---|---|---|
| 2,889,134 | 6/1959 | Bryant | 251—174 X |
| 3,195,857 | 7/1965 | Shafer | 251—174 X |
| 3,208,718 | 9/1965 | White | 251—315 X |
| 3,227,174 | 1/1966 | Yost | 251—368 X |
| 3,304,050 | 2/1967 | Fawkes | 251—306 |

ROBERT W. MICHELL, *Primary Examiner.*